June 29, 1926.

J. M. QUIGLEY ET AL 1,590,548

DIRECTION INDICATOR

Filed June 22, 1925

2 Sheets-Sheet 1

INVENTOR.
JOHN M. QUIGLEY
CHARLES E. QUIGLEY
BY
ATTORNEYS.

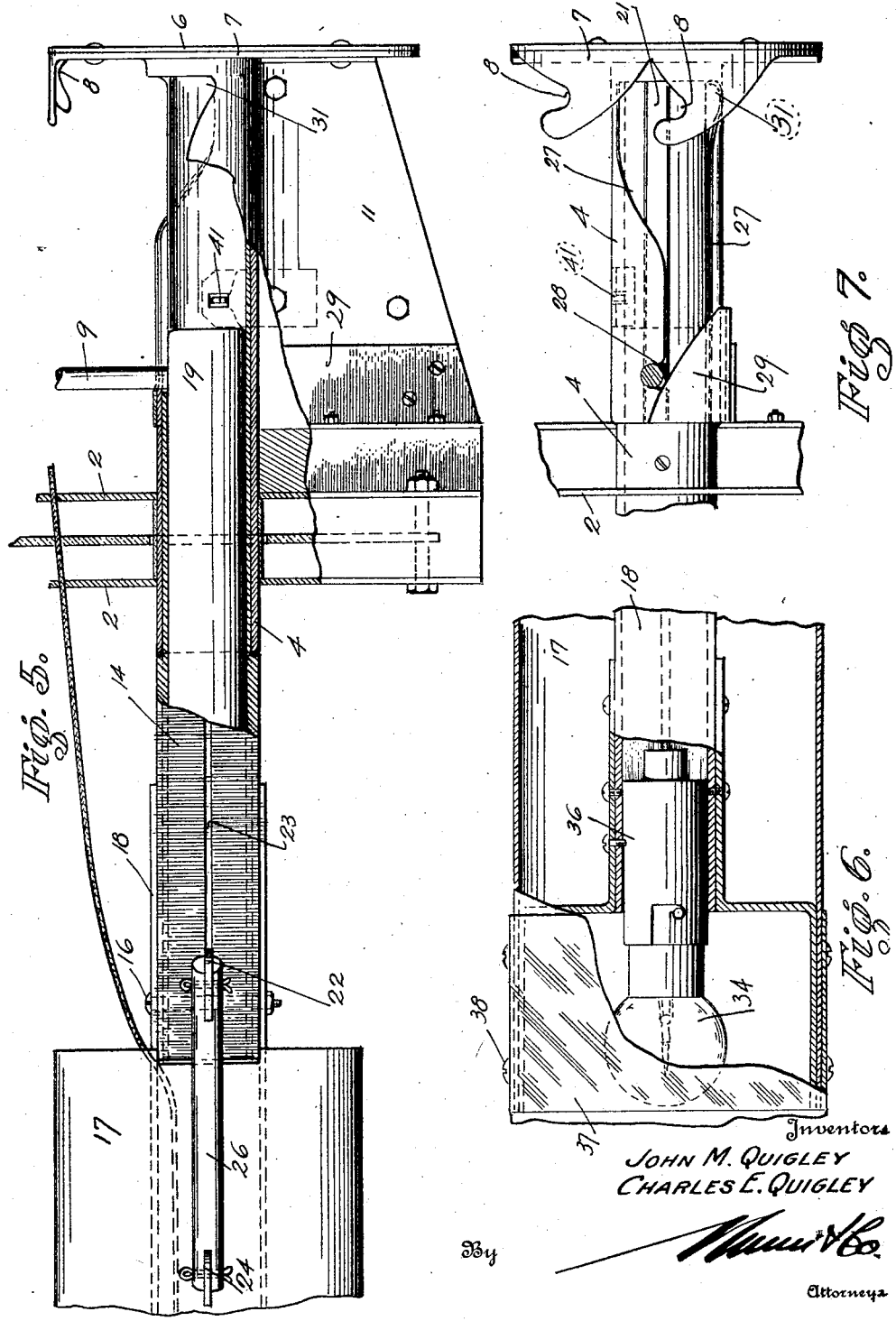

Patented June 29, 1926.

1,590,548

UNITED STATES PATENT OFFICE.

JOHN M. QUIGLEY AND CHARLES E. QUIGLEY, OF SACRAMENTO, CALIFORNIA.

DIRECTION INDICATOR.

Application filed June 22, 1925. Serial No. 38,871.

The present invention relates to improvements in direction indicators for motor vehicles and the like, and its particular object is to provide an indicator of the character described consisting of an arm hinged in front of the windshield of a vehicle and adapted to be swung from a straight forward position to a transverse position for the purpose of indicating to persons in front or in the rear of the vehicle that the driver of the vehicle intends to change the speed or the direction of the same.

A further object of the invention is to provide means whereby the arm after having been swung sideways may be manipulated for swinging motion in a vertical plane and may be adjusted to various positions in said plane for the purpose of giving different signals. Under the system now commonly used, a placing of the arm in the horizontal plane would indicate that the driver intends to turn to the left while a downwardly slanting position would indicate the intention to stop, and an upwardly pointing signal, the intention to turn to the right. The arm may further be swung up and down for the purpose of effecting another signal as, for instance, a proper signal for an intention to back up.

It is further proposed to provide an operating mechanism for this arm that extends through and is supported in the windshield or a corresponding element of the car, and that may be manipulated from the driver's seat in the rear of the windshield, by purely mechanical means.

It is further proposed to provide a light signal in combination with the mechanically operated signal and to provide a switch automatically closing the light circuit when the signal is manually operated for the purpose of indicating intended changes in speed or direction.

It is further proposed to provide a mirror near the end of the signalling arm so that when the latter is placed into a signalling position, the mirror gives an opportunity to the driver of the vehicle to view the situation in the rear of the car.

Further objects and advantages of my device will appear as the specification proceeds.

The preferred form of my invention is illustrated in the accompanying drawing, in which—

Figure 1:
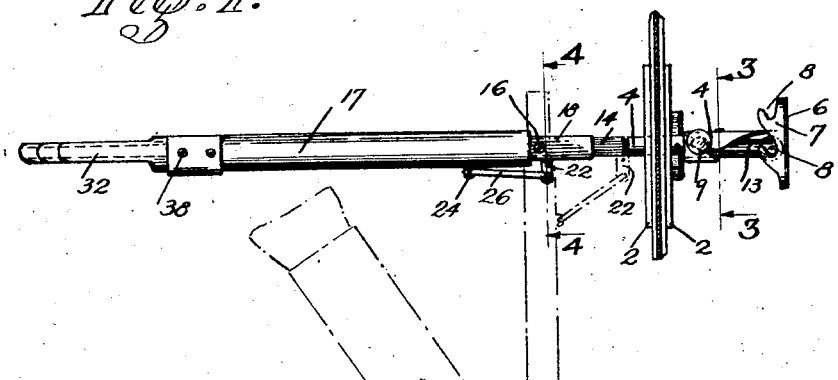

Figure 1 shows a plan view of our device as attached to the windshield of a motor vehicle, the arm pointing straight ahead.

Figure 2:
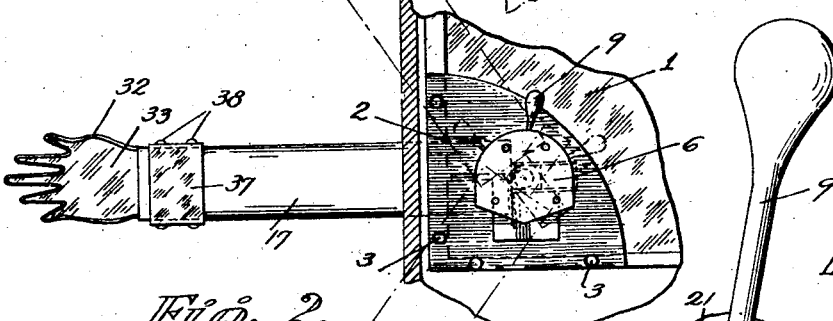

Figure 2 a rear view of our device, the arm being swung sideway and different positions being indicated in dotted lines.

Figure 3:
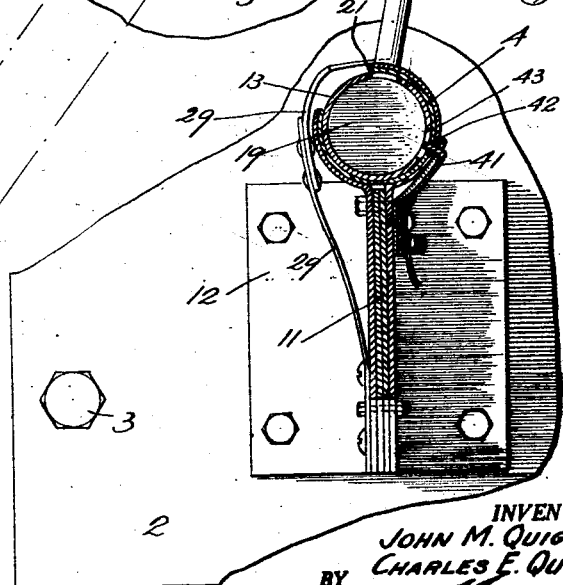

Figure 3 an enlarged cross section taken along line 3—3 of Figure 1.

Figure 4:
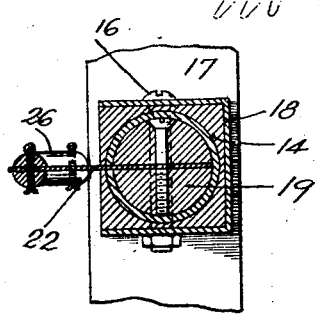

Figure 4 an enlarged cross section taken along line 4—4 of Figure 1.

Figure 5 a side view of the principal operating parts of the invention, portions being shown in longitudinal section.

Figure 6 a side view of a lamp bearing portion of the arm, partly shown in section, and Figure 7 an enlarged detail view in plan of the operating end of our mechanism.

While we have shown only the preferred form of the invention, we wish to have it understood that various changes or modifications may be made within the scope of the claims hereto attached without departing from the spirit of the invention.

Where the left hand lower corner of the windshield 1 is desired to be used for the support of our signal, two plates 2 are preferably secured to the frame of the windshield, on opposite sides thereof, by means of bolts 3 so as to provide rigid support for a bearing 4 which penetrates the glass, extends slightly forward of the same and extends rearwardly to a considerable extent to terminate at its rear end in a transverse plate 6 provided with a flange 7 pointing toward the windshield and notched, as shown at 8, to accommodate the operating member 9 which will be referred to later, for holding the same in any one of a plurality of different positions. The bearing is preferably reinforced by means of suitable supporting webs 11, the flanges 12 of which are secured to the inner plate 2.

In the bearing is supported, with freedom of rotary motion, a sleeve 13 terminating at its front end in a squared portion 14 to the front end of which latter is pivoted, as shown at 16, the rear end of the arm 17, the arm having a channel shaped extension 18 engaging with the squared portion 14 of the sleeve when the arm is alined with the latter and thereby preventing the arm from going beyond an alined position.

To allow the arm to be swung from a straight forward position to the left into the position indicated in dotted lines in Figure 1, we use a bolt 19 slidable in the sleeve and adapted to be operated by means of the handle 9 previously mentioned which latter extends through a longitudinal slot 21 of the sleeve so that the handle may be freely slid forward and backward between the windshield and the rear plate 6. The bolt has a lug 22 extending laterally from its front end and adapted to ride in a slot 23 in the left side of the squared portion 14 of the latter. The arm 17 also has a lug 24 extending therefrom in the plane of the lug 22 and at a convenient distance from the pivot 16. The two lugs are interconnected by a link 26 which latter engages the lug 22 at some distance from the pivot 16 so that when the lug 22 is pulled backward by the driver retracting the handle 9 of the bolt 19, the arm 17 is swung to the left on the pivot 16 and vice versa when the bolt 19 is advanced, the arm 17 is drawn into alinement with the sleeve.

It will be seen that in this manner the mere advancing or retracting of the operating handle 9 by the driver will cause the arm 17 to swing on its pivot to occupy either an alined position or to swing to the left into an angular position. The bearing member 4 is slotted as shown at 27 to allow the operating handle to be advanced and withdrawn. This slot, however, is not merely a straight slot, but has a configuration to allow various other functions to be performed by the walls lining the slot. In its front portion, the slot is substantially straight except that a notch 28 is formed near the windshield into which the handle 9 is automatically forced by means of a spring 29 whenever the handle reaches its most forward position. The rear end of the slot 27 is widened considerably so as to allow of play of the handle within the slot for allowing the arm after having been swung sideway to be operated for swinging motion in a vertical plane to occupy a straight horizontal, an upwardly inclined, or a downwardly inclined position respectively. For a downwardly inclined position of the arm, the handle is lodged through the weight of the arm in a notch 31 at the end of the slot 27. To hold the arm in a horizontal position, the handle is placed by the driver in the first one of the notches 8 and for holding the arm in an upwardly slanting position the second notch 8 is used.

To combine an electrical signal with the mechanical signal, the arm is made to terminate in a hand 32 having sides 33 made of transparent material. A lamp 34 is secured in any suitable manner as by the socket 36 in the wrist portion of the arm so that the hand will be illuminated from the inside thereof and the lamp is made accessible by a gate 37 removably secured over a registering opening in the wrist portion of the arm by means of screws 38. The exposed face of this gate is preferably made of reflecting material to serve as a mirror when the arm is swung into a sideway position so as to inform the driver of what is happening in the rear of the car.

Normally the driver of a motor vehicle may not wish to have the signal light burn all the time, but only when he swings the arm sideway for the purpose of giving a specific signal. To allow of the use of the light in this manner, we associate an electric switch with the operating bolt, the switch comprising the bolt itself as one terminal and a spring 41 extending through perforations 42 and 43 in the bearing and the sleeve respectively into operative contact with the bolt when the latter is retracted. The spring 41 is placed in such a manner that when the bolt is advanced to its most forward straight ahead position, it clears the contact 41 and thereby causes the light to become extinguished.

The manner of operating the device is readily understood from the foregoing description.

Normally the handle 9 is pushed forward to occupy the notch 28 in the bearing and to force the arm 17 into a straight forward position. In this position the switch for the lighting system is opened so that no light is visible through the transparent faces of the hand. When the driver wishes to stop or to turn to the left or right, he pulls the handle 9 backward after freeing the same from the notch 28, thereby swinging the arm to the left and when reaching the rear end of the sleeve he lodges the handle in either the recess 31 of the bearing or one of the notches 8 of the flange 7 according to what signal he wishes to give. If he desires to give the signal for backing up, he may revolve the handle 9 before reaching the extreme end of the sleeve which will cause the arm to be swung up and down in a vertical plane.

We claim:

1. In a direction indicator for a motor vehicle, a sleeve, a bearing for the same, an indicating arm pivoted to one end of the sleeve, a bolt slidable in the sleeve, an operating element for the bolt and on operative connection between the bolt and the arm causing the arm to aline with the sleeve when the bolt is advanced and to swing on its pivot so as to form an angle with the sleeve when the bolt is retracted.

2. In a direction indicator for a motor vehicle, a sleeve, a bearing for the same, an indicating arm pivoted to one end of the sleeve, a bolt slidable in the sleeve, an operating element for the bolt and an operative connection between the bolt and the arm causing the arm to aline with the sleeve when the bolt is advanced and to swing on its pivot so as to form an angle with the sleeve when the bolt is retracted, the bearing having guiding means for the operating element associated therewith holding the sleeve against rotation when the bolt is advanced and allowing for revolving movement between defined positions when the bolt is retracted.

3. In a direction indicator for a motor vehicle, a sleeve, a bearing for the same, an indicating arm pivoted to one end of the sleeve, a bolt slidable in the sleeve, an operating element for the bolt, a lug pivoted to the bolt extending laterally therefrom and rising in a slot in the sleeve, a lug fixed to the arm, a link connecting the two lugs and causing the arm to aline with the sleeve when the bolt is advanced and to swing on its pivot so as to form an angle with the sleeve when the bolt is retracted.

4. In a direction indicator for a motor vehicle, a sleeve, a bearing for the same, an indicating arm pivoted to one end of the sleeve, a bolt slidable in the sleeve, an operating element for the bolt, a lug pivoted to the bolt extending laterally therefrom and rising in a slot in the sleeve, a lug fixed to the arm, a link connecting the two lugs and causing the arm to aline with the sleeve when the bolt is advanced and to swing on its pivot so as to form an angle with the sleeve when the bolt is retracted, the bearing being slotted to accommodate the operating element and formed to hold the latter against rotary motion when the bolt is advanced, while permitting of rotary motion when the bolt is retracted.

5. In a direction indicator for a motor vehicle, a sleeve, a bearing for the same, an indicating arm pivoted to one end of the sleeve, a bolt slidable in the sleeve, an operating element for the bolt, a lug pivoted to the bolt extending laterally therefrom and rising in a slot in the sleeve, a lug fixed to the arm, a link connecting the two lugs and causing the arm to aline with the sleeve when the bolt is advanced and to swing on its pivot so as to form an angle with the sleeve when the bolt is retracted, the bearing being slotted to accommodate the operating element and formed to hold the latter against rotary motion when the bolt is advanced, while permitting of rotary motion when the bolt is retracted, and means being provided for allowing the operating element, when retracted, to be locked in any one of various positions.

CHARLES E. QUIGLEY.
JOHN M. QUIGLEY.